Feb. 21, 1950     J. F. STRMISKA     2,498,463
TRIGGER FOR JUMPING ANIMAL TRAPS
Filed Jan. 2, 1948
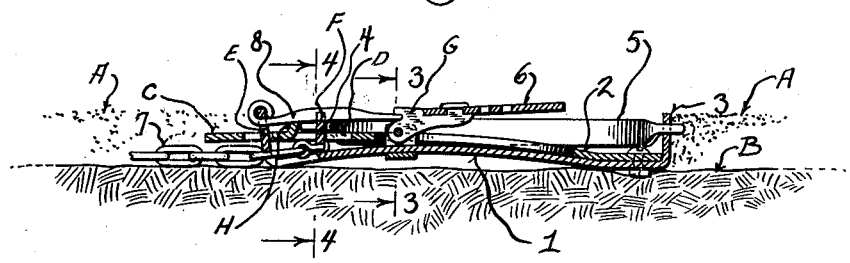
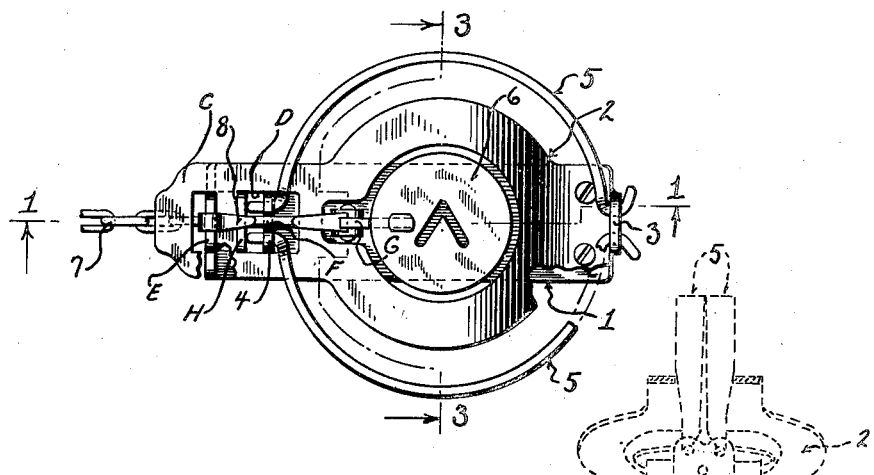
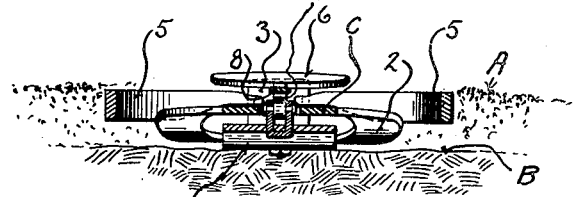
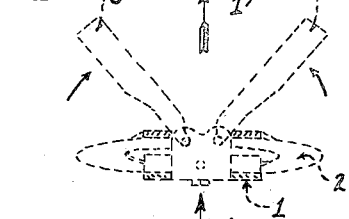
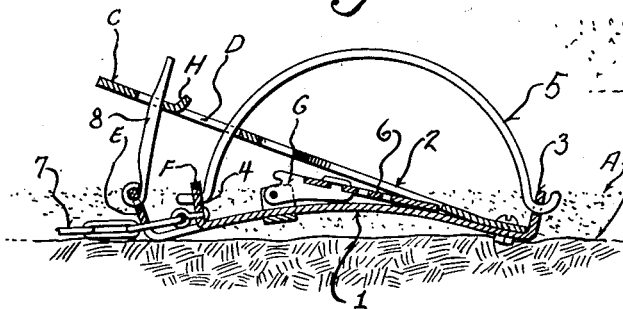
INVENTOR
JOSEPH F. STRMISKA
BY
ATTORNEYS Patented Feb. 21, 1950

2,498,463

UNITED STATES PATENT OFFICE 2,498,463

TRIGGER FOR JUMPING ANIMAL TRAPS

Joseph F. Strmiska, Merrimac, Wis.

Application January 2, 1948, Serial No. 326

1 Claim. (Cl. 43—92)

My invention refers to jumping animal traps, and it has for its object to provide a standard biting jawed trap having a ground spring and a trigger spring, the same being controlled by a bait pad and trigger lever. The free ends of both biting jaws are normally flared with relation to each other, and the same are locked in their flared position by a trigger lever engaging the tooth shank of a bait pad, whereby when the pad is depressed, it will release the trigger lever, causing the biting jaws to fold up and the ground spring to lift and force the trap upward to cause the biting jaws to grasp a leg of an animal above its foot. Thus, it will eliminate the possibility of the animal being trapped at the foot extremity which may result in freeing said animal caused by gyrating and pulling of the animal to release the same from its trapped position.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

In the drawings:

Figure 1 represents a sectional side elevation of a spring jawed trap embodying the features of my invention, the section being indicated by line 1, 1 of Figure 2.

Figure 2 is a plan view of the same.

Figure 3 is a cross section of the trap, the section being indicated by line 3, 3 of Figure 2.

Figure 4 is another cross sectional view through the trap, the section being indicated by line 4, 4 of Figure 1; and Figure 5 is a longitudinal sectional view through the trap after the same has been sprung, the said section being also line 1, 1 of Figure 2.

Referring by characters to the drawing, 1 indicates a slightly bowed ground spring and secured to one end of the same is a trigger spring 2, having a central circular opening therein and a tongue extension C at its free end, the said extension being provided with a compartment aperture D, having a transversely positioned partition therein, which partition is formed with an upturned lip H.

One end of the ground spring 1 is provided with an upturned ear 3 and a similar ear 4 is extended upwardly from said spring adjacent to the other end of the same.

The pair of ears 3 and 4 are apertured for pivotal engagement with a pair of standard bowed biting jaws 5, 5, which jaws, above their pivots, extend through the compartment of the trigger spring aperture D, it being understood that this compartment has also extending through it the ear 4 when the trap is set.

The ear 4 of the ground spring 1 has secured thereto the usual anchor chain 7.

The juxtaposed end of the ground spring terminates with an upwardly extended lug E, which lug, when the trap is set, extends through the smaller compartment of the trigger spring aperture D, as best indicated in Figures 1 and 2 of the drawings.

It should also be noted that the upturned ear 4, is provided with a central pocket F, adapted to have nested therein a trigger lever 8.

As clearly illustrated, the trigger lever 8, is pivoted to the end of the lug E and when the trap is set, the said trigger lever 8 is fulcrumed upon the upturned lip H, of the aperture D, and said lever is also nested within the pocket F to hold the same against lateral movement, it being understood that the end of said lever 8, in this locked position, engages a toothed shank G of the bait pad 6, whereby said pad is locked.

Thus, it will be noted, when the trap is set, the lug E projects through the rear compartment of the aperture D.

As indicated in Figures 3 and 4 of the drawings, when the trap is set, it is suitably concealed in a layer of soil A upon the ground line B.

From the foregoing description, it is apparent that when the tension of the bait pad is released, it will cause the ground spring to shoot the trap upwardly, as indicated in dotted lines Figure 4, whereby the biting jaws 5, through engagement with the compartment aperture D, will be immediately locked in their biting position, as indicated in dotted lines Figure 4 of the drawings, to thus insure grasping the trapped animal far above its foot. In other words, the jumping trap will, under all conditions, insure a safe grip upon the trapped animal far above its foot.

I claim:

An animal trap of the jumper type comprising a ground spring having ears extending upwardly therefrom, one of said ears being provided with a centrally disposed pocket, a pair of biting jaws pivoted to the ears, a lug extending upwardly from an end of the ground spring adjacent the central pocketed ear, a trigger spring having one end secured to the ground spring and the free end thereof terminating with a tongue extension defining an aperture interrupted by a transversely disposed partition having an upturned fulcrum lip, whereby the ground spring lug engages the walls of the end compartment of the aperture and the ground spring pocketed lug end engages the walls of the other aperture compartment, a bait pad pivoted to the ground spring having a toothed shank, and a latch lever pivoted to the end of the ground spring lug and engageable with the aperture partition fulcrum lip and tooth of the bait pad shank, whereby the same is locked in its set position, the latched lever being nested within the juxtaposed lock pocket to eliminate lateral movement of said latched lever.

JOSEPH F. STRMISKA.

REFERENCES CITED

The following references are of record in the file of this patent:

UNITED STATES PATENTS

| Number | Name | Date |
| --- | --- | --- |
| 125,449 | Frisbie et al. | Apr. 9, 1872 |
| 1,312,690 | Greene | Aug. 12, 1919 |
| 1,862,580 | Pneuman | June 14, 1932 |